United States Patent [19]
Fredriksson

[11] Patent Number: 5,906,032
[45] Date of Patent: May 25, 1999

[54] COUPLING LINK

[75] Inventor: Lars Fredriksson, Åkersberga, Sweden

[73] Assignee: Frenolink Forvaltnings AB, Akersberga, Sweden

[21] Appl. No.: 08/765,724

[22] PCT Filed: Jun. 21, 1995

[86] PCT No.: PCT/SE95/00766
§ 371 Date: Apr. 7, 1997
§ 102(e) Date: Apr. 7, 1997

[87] PCT Pub. No.: WO96/00861
PCT Pub. Date: Jan. 11, 1996

[30] Foreign Application Priority Data

Jun. 30, 1994 [SE] Sweden ................................. 9402318

[51] Int. Cl.⁶ .................................................. F16G 15/00
[52] U.S. Cl. ........................... 24/116 R; 24/370; 24/682.1
[58] Field of Search .............................. 24/116 R, 682.1, 24/662, 115 R, 135 N; 59/93, 85

[56] References Cited

U.S. PATENT DOCUMENTS

| 419,725 | 1/1890 | Snyder et al. | 24/116 R |
|---|---|---|---|
| 919,699 | 4/1909 | Davis | 24/116 R |
| 1,889,633 | 11/1932 | Butterworth | 24/116 R |
| 2,165,377 | 7/1939 | Henry | 24/116 R |
| 2,519,980 | 8/1950 | Renz | 24/370 |
| 2,637,591 | 5/1953 | Maxfield et al. | 24/115 R |
| 4,149,369 | 4/1979 | Smetz | 24/116 R |

FOREIGN PATENT DOCUMENTS

| 2092652 | 1/1972 | France . | |
|---|---|---|---|
| 1225002 | 9/1966 | Germany | 24/116 R |
| WO83/03649 | 10/1983 | WIPO . | |

Primary Examiner—Victor N. Sakran
Attorney, Agent, or Firm—Quarles & Brady LLP

[57] ABSTRACT

A coupling link (100) to be interconnected between a hoisting device and a shortenable hoisting chain (54,55,56) is provided. The coupling link is elongated and comprises a connecting portion (110) in the form of a loop for connection to the hoisting device and an anchoring portion (150) for anchoring of an end link (51) of the hoisting chain. A selected link, namely a support link (55), of the hoisting chain is inserted in a support slot (132) between two support shanks (131a, 131b) of the coupling link, and a hoisting chain link adjoining the support link, namely an engagement link (54), will make contact, at an end portion thereof, with corresponding seating surfaces (133a, 133b). The loop portion (110) defines a free internal space (111), which is dimensioned to enable pulling through the hoisting chain (50) for adjustment of its effective length and which directly adjoins the support slot (132).

23 Claims, 6 Drawing Sheets

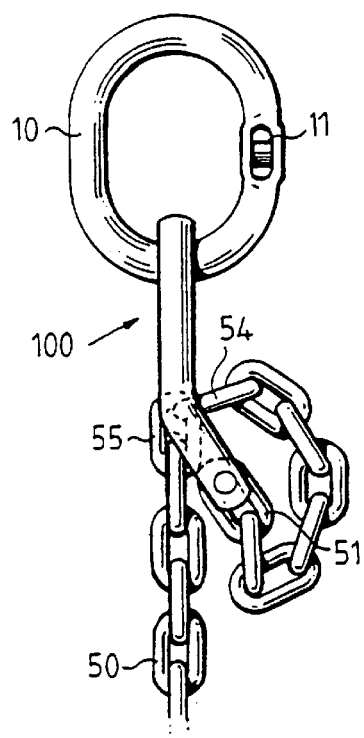
Fig 1a
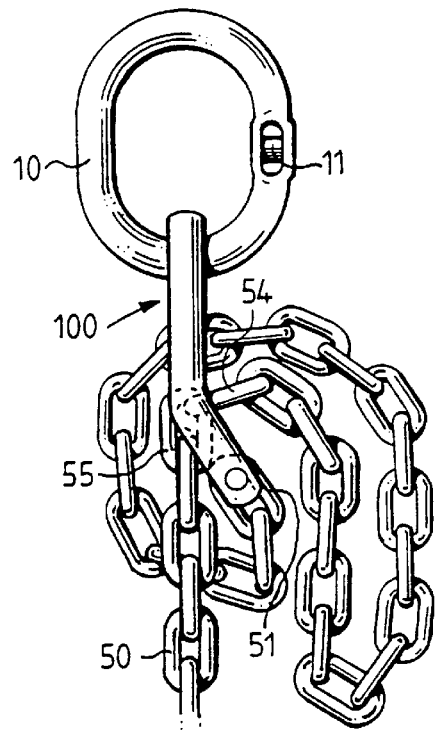
Fig 1b
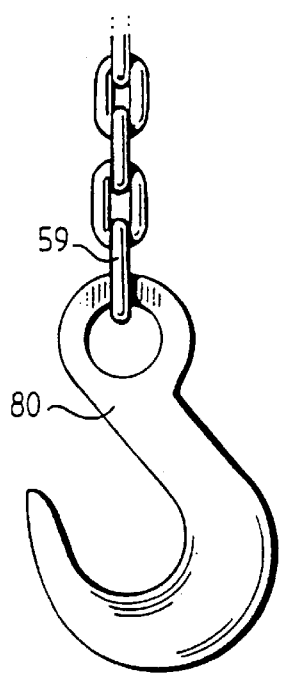
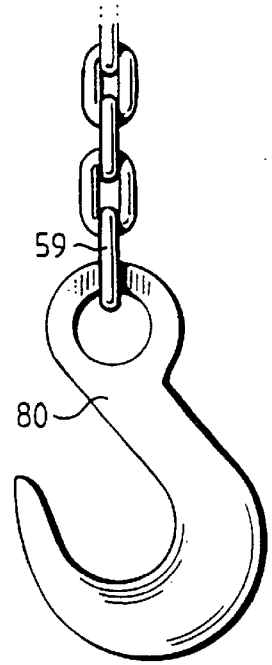

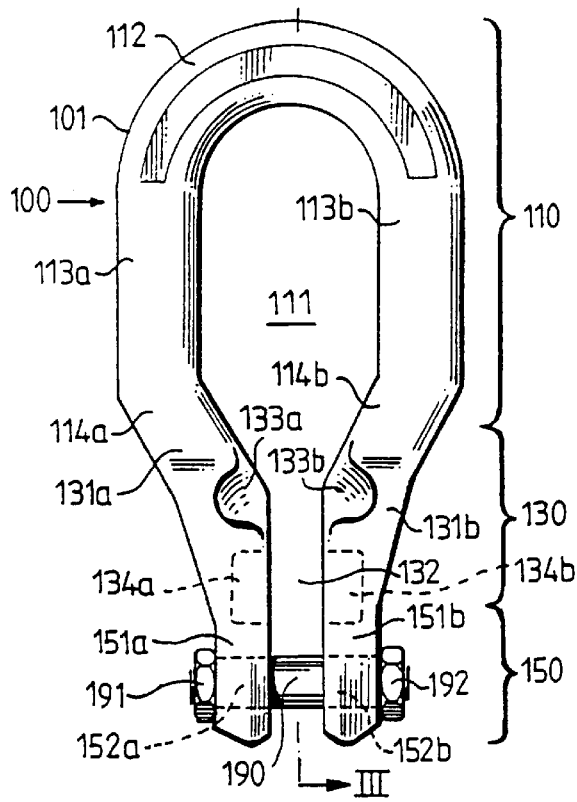
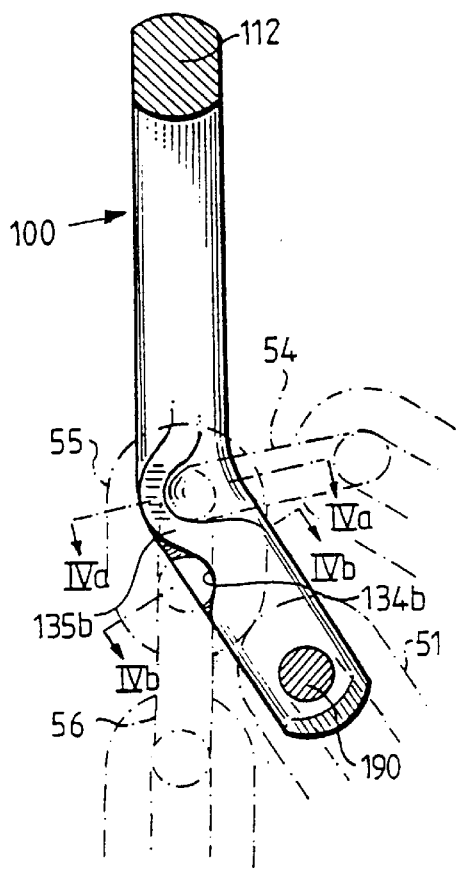
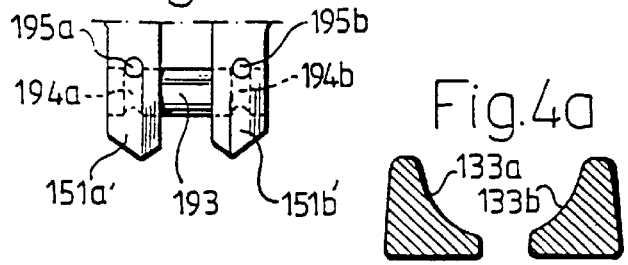
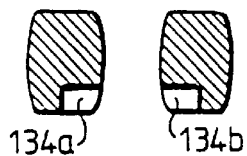

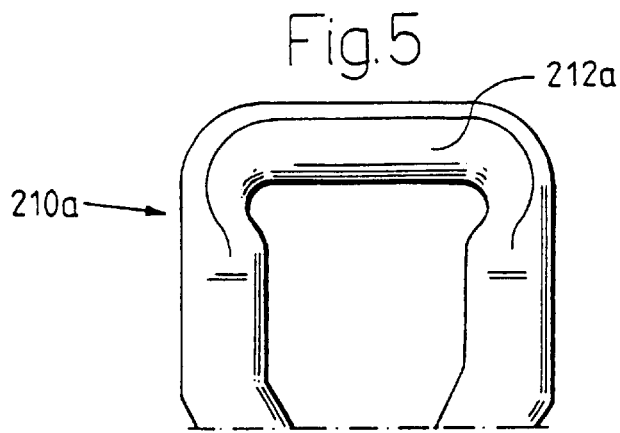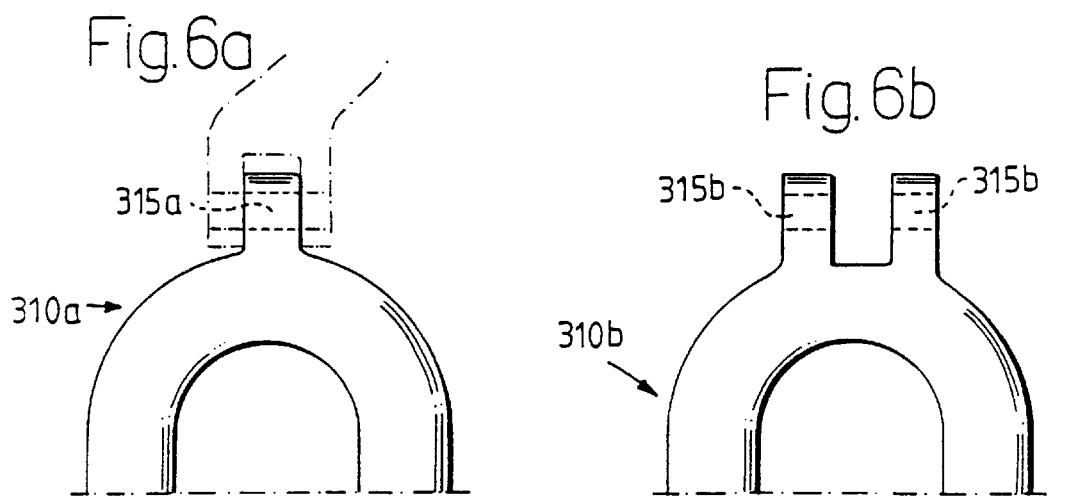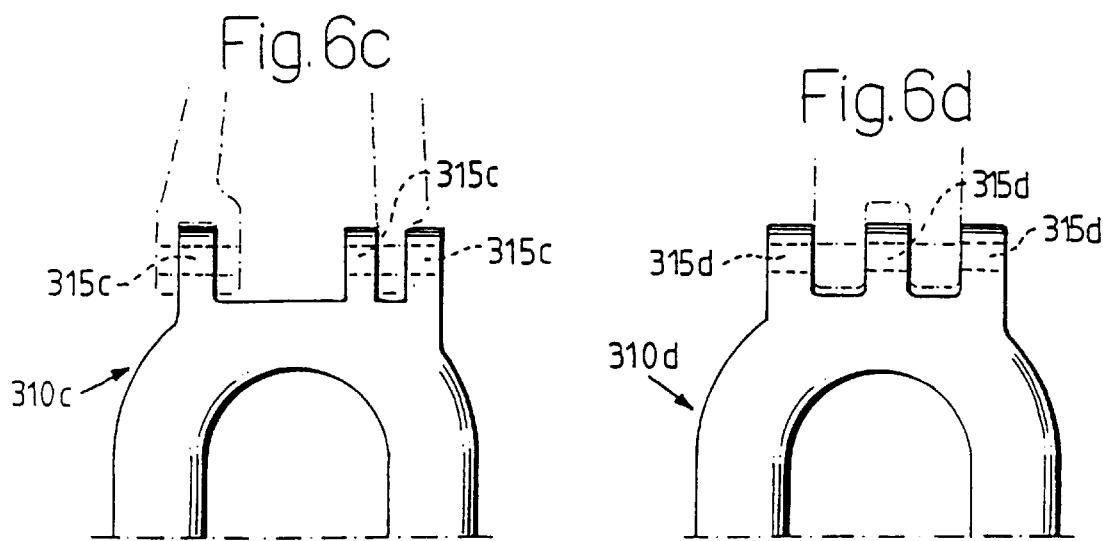

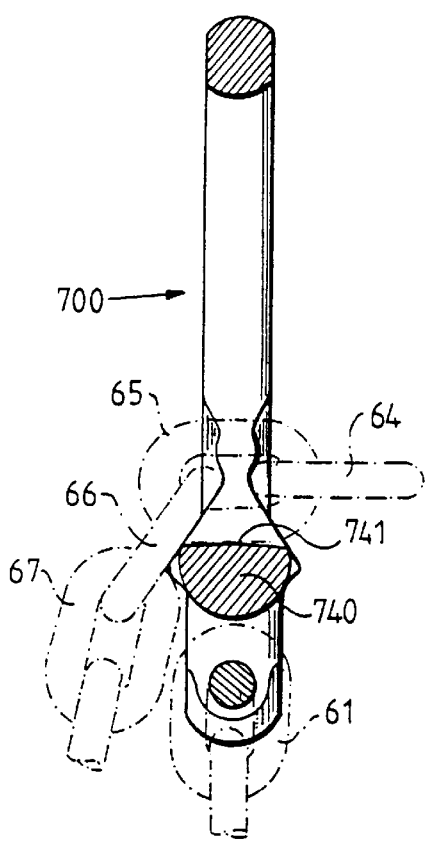
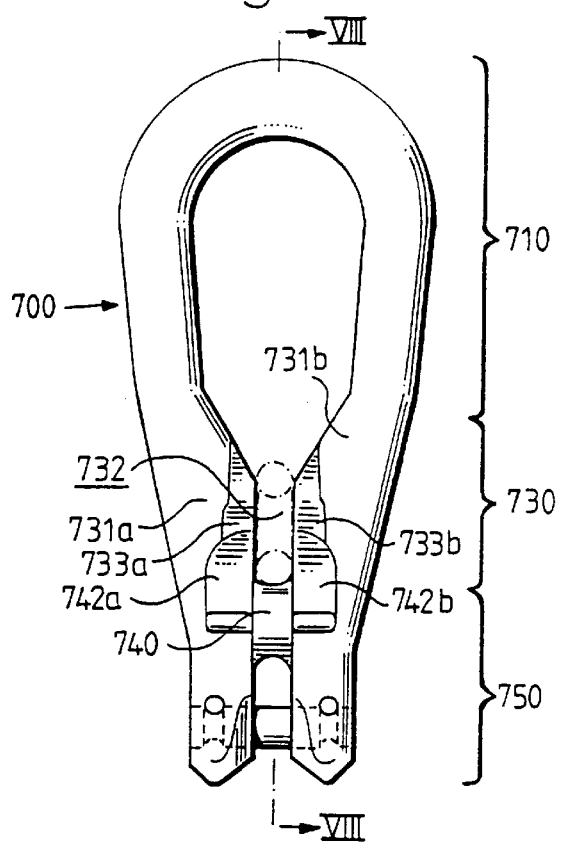
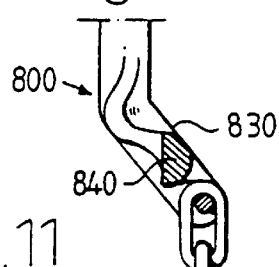
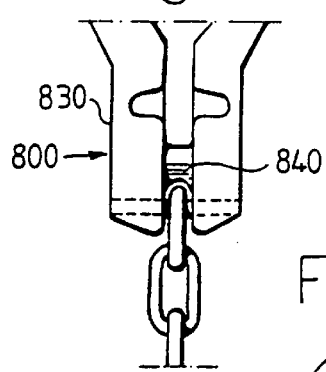
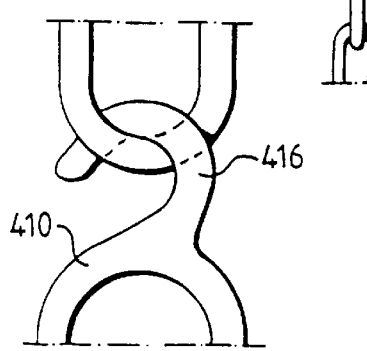
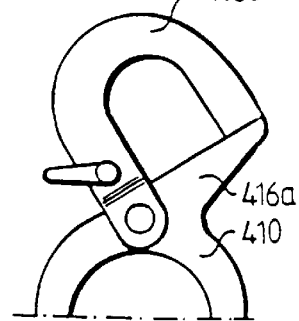

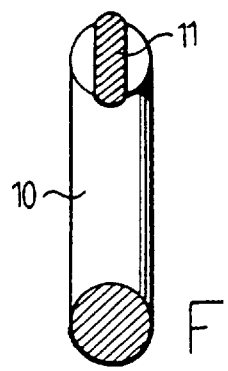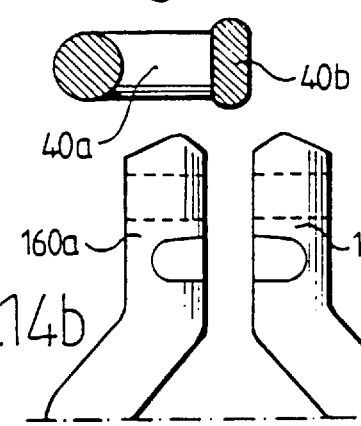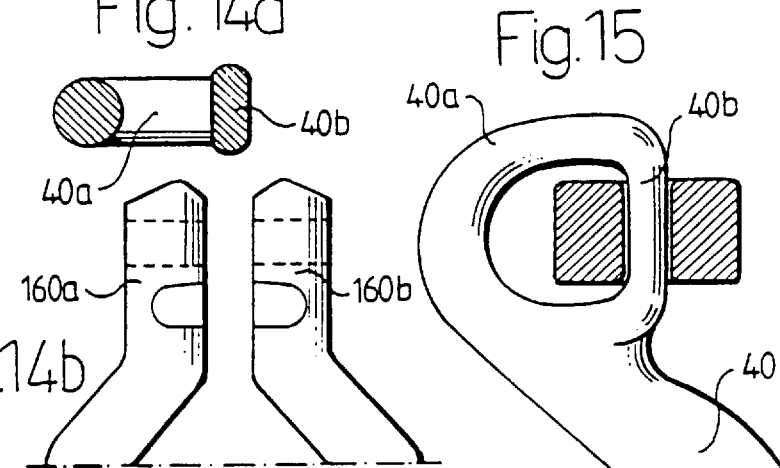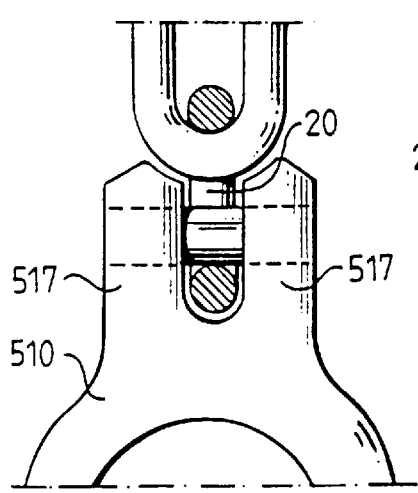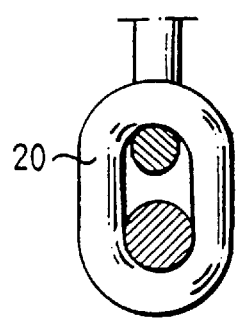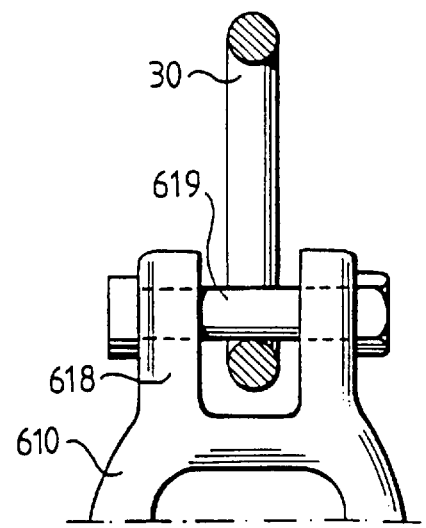

COUPLING LINK

The invention concerns a coupling link to be interconnected between a hoisting means and a shortenable hoisting chain. Such a coupling link may, e.g., be used for interconnection of a ring or the like at the end of a chain, hanging down from a hoisting crane, and a shortenable hoisting chain, which is provided with a lifting hook at its other end. It is desirable to adjust the effective length of the hoisting chain, e.g., for adjustment of the vertical position of the lifting hook, so that a load can be suspended, or for applying a hoisting chain loop around the load.

A coupling link of this kind is previously known from WO 83/03649 (Parsons Controls Ltd) and comprises a connection portion for connection to the hoisting means, and an anchoring portion for anchorage of an end link of the hoisting chain. Furthermore, the coupling link, which is denoted "shortening clutch" in said publication, comprises two support shanks with an intermediate support slot for receiving a selected hoisting chain link, in the following denoted "support link", wherein a hoisting chain link adjoining the support link, denoted "engagement link", engages, at an end portion thereof, with corresponding seating surfaces formed in the support shanks. Thus, the hoisting chain will be secured in a shortened configuration in the coupling link.

However, the previously known coupling link has a number of drawbacks. When it is to be connected to a hoisting means, such as a ring-shaped larger link, denoted "main link" in the publication, one has to use a shackle, the pin of which is inserted through a connection eye in the upper part of the coupling link, as well as another coupling link, at least in case two or more shortening coupling links are to be interconnected with the main link.

Furthermore, in the previously known coupling link, the connection eye for said shackle pin, the corresponding connection eye for anchorage of the end link of the hoisting chain and said support shanks are situated at the corner points of an imaginary, substantially regular triangle. The support shanks are arranged in such a way that the support and engaging links of the hoisting chain are freely accessible from the outside when handling and loading the coupling link. This will involve a risk for these links to be detached from engagement under the influence of hits and blows, or to be deformed and get stuck, or for the links and/or the support shanks to break when being handled roughly. The above mentioned triangular configuration will also bring about a substantial inclination of the coupling link when the load is shifted from the end link to the engagement link of the hoisting chain.

The previously known coupling link also involves a voluminous and heavy structure which makes the manufacture complicated and expensive.

The object of the present invention is therefore to accomplish a coupling link, of the kind defined in the preamble of appended claim 1, which requires fewer or no coupling members for interconnection with a hoisting means, which secures a protected positioning of the support and the engagement links of the hoisting chain in engagement position and which has a simple and light weight structure. The coupling link shall also be easy to handle and be useful in many different applications. It should also enable manufacture thereof by conventional technology at low cost. Preferably, the structure should be such that the coupling link is only slightly inclined when being loaded, if at all.

According to the invention, these objects are achieved in that the coupling link is elongated and comprises a first end portion formed as a loop portion, which constitutes said connection portion, a mid portion, which is provided with said support shanks and said support slot, and a second end portion, which constitutes said anchoring portion, wherein said loop portion defines a free interior space, which is dimensioned to enable pulling through the hoisting chain for adjustment of its effective length and which directly adjoins said support slot of said mid portion, and in that said loop portion, said mid portion and said anchoring portion of the coupling link are made in one piece of a link body having a shank thickness, which substantially exceeds that of the links of the associated hoisting chain.

By way of the elongated structure of the coupling link and the dimensions of the loop portion, the coupling link may, if desired, be connected directly to the hoisting means, in particular without intermediate connection of separate coupling members, since the loop portion will receive a part of the hoisting means. This can be accomplished in a particularly simple manner if the coupling link has a fork-like structure, which constitutes the mid portion and the anchoring portion, with two separate shanks, which can be threaded over said part of the hoisting means.

The support shanks, which are provided with seating surfaces in the mid portion of the coupling link, adjoin the loop portion directly and secure that the support and engagement links of the hoisting chain will be located in protected positions when being engaged so that the links and the cooperating support shanks of the coupling link can be kept intact without being damaged, even upon a possible careless handling of the hoisting chain. The handling procedure will also be particularly simple. When the effective length of the hoisting chain is to be changed, the links of the hoisting chain are being passed through the loop portion, and when a desired length has been obtained it is only necessary to depress the particular link as a supporting link between the support shanks, whereupon the adjacent link will be engaged as an engagement link with the seating surfaces of the support shanks.

The elongated structure of the coupling link will make it possible to connect two or more coupling links directly to the same hoisting means, e.g., an oval ring, without any risk of mutual interference of the associated hoisting chains. Moreover, the inclination of a coupling link upon being loaded will be limited, especially if the two end portions of a coupling link are located substantially in the same plane or in different planes forming a small angle therebetween.

The coupling link according to the invention can be manufactured in a relatively simple manner in that a round bar-iron is forged substantially into U-shape, with a widened loop portion, and is subsequently processed for the making of seating surfaces, recesses, bores, and the like.

As will be defined more precisely in the appending claims and the following detail description, the coupling link according to the invention may be embodied in various way. Moreover, it can be combined with other coupling members. As an example, it may be permanently connected to an oval ring serving as a hoisting means and being inserted into the loop portion of the coupling link at the time on manufacture and being closed thereafter, e.g., by welding. If so desired, the coupling link may be indirectly connected to a number of rings which in a similar manner are connected to other similar coupling links.

The invention will be explained more fully below with reference to the appended drawings illustrating different embodiments.

FIG. 1a is a side view of a hoisting chain, which carries a lifting hook at its lower end and is shortened at its upper end by engagement with a coupling link according to the invention, which in turn is connected to an oval ring;

FIG. 1b shows the same hoisting chain, lifting hook and coupling link as in FIG. 1a, although the hoisting chain is arranged in a different way;

FIG. 2 is a plan view of the coupling link (without chain), and FIG. 2a shows a modified embodiment of the anchoring portion of the coupling link;

FIG. 3 is a sectional view along the line III—III in FIG. 2 (with some of the hoisting chain links being indicated by dash-dotted lines);

FIG. 4a is a sectional view along the line IVa—IVa in FIG. 3, and FIG. 4b is a sectional view along the line IVb—IVb in FIG. 3;

FIG. 5 is a side view of a modified embodiment of the loop portion of the coupling link;

Figure 18:
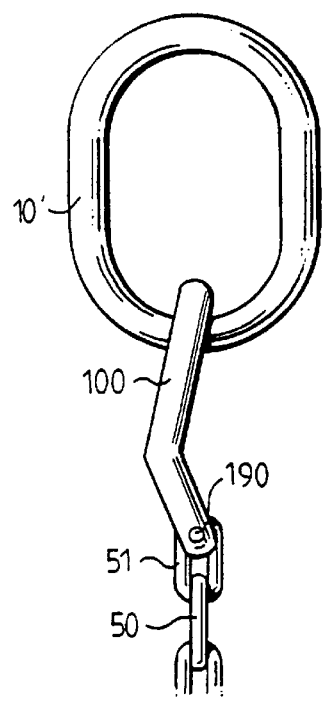
Figure 19:
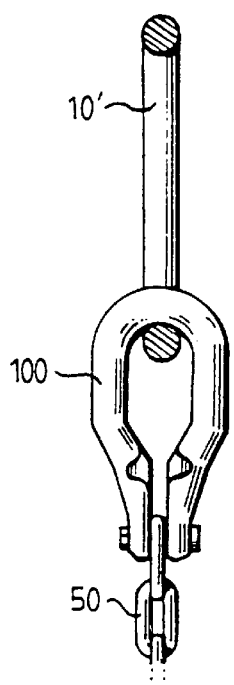
Figure 20:
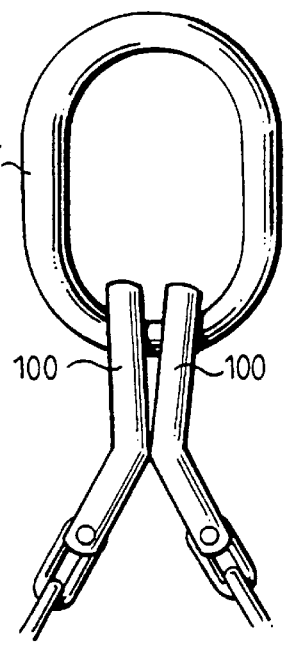
Figure 21:
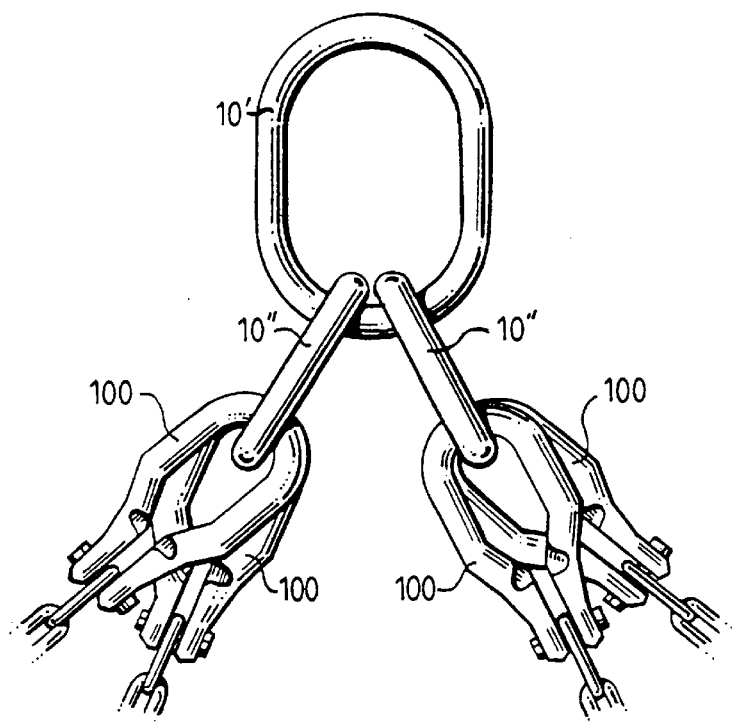

FIGS. 6a, 6b, 6c, and 6d illustrate further modifications of the loop portion with external connection lugs;

FIG. 7 is a side view of a second embodiment of a coupling link according to the invention;

FIG. 8 is a sectional view along the line VIII—VIII in FIG. 7;

FIGS. 9 and 10 illustrate a modified embodiment of the anchoring portion of the coupling link according to FIG. 2 and FIG. 3;

FIG. 11 shows a modified embodiment of the loop portion of the coupling link with an integrated hook part;

FIG. 12 illustrates a further modification of the loop portion with a closable hook part;

FIG. 13 is a cross section through the oval ring at the top of FIG. 1;

FIG. 14a and FIG. 14b are sectional views of the eye portion of a lifting hook and a fork portion of a coupling link according to the invention, respectively;

FIG. 15 illustrates the same combination as in FIG. 14a and FIG. 14b, the lifting hook being illustrated in a side view;

FIG. 16a and FIG. 16b illustrate the loop portion of the coupling link with external lugs connected to the end link of a chain;

FIG. 17 shows a modified embodiment with the loop portion externally connected to a larger link or ring;

FIG. 18 and FIG. 19 illustrate a coupling link and a permanently connected larger ring;

FIG. 20 illustrate two coupling links which are permanently connected to a larger common ring; and FIG. 21 illustrates a combination including a large ring, two small rings and four coupling links, each with a hoisting chain.

The coupling link 100 shown in FIGS. 1, 2 and 3 is connected at its upper part with an oval ring 10 (compare FIG. 13) serving as a hoisting means and being, e.g., connected to a chain, a lifting strap or a hook hanging down from a crane, an overhead crane or some other lifting or pulling device. The oval ring 10 has at a longer side a flat portion 11, the cross sectional area of which being substantially the same as the other cross sections of the ring, but the width thereof being dimensioned to fit with some play between the separate shanks of the coupling link 100 (at the bottom of FIG. 2). Upon detachment of an anchoring pin 190, the oval ring 10 has been inserted in the coupling link 100 into the position illustrated in FIGS. 1a and 1b. At the bottom, the coupling link carries a hoisting chain 50, one end link 51 of which (the upper end link in FIGS. 1a and 1b) being anchored to the anchoring pin 190 of the coupling link, and the other end link 59 of which (the lower link in FIGS. 1a and 1b) being connected to a lifting hook 80. The purpose of this arrangement is to enable a convenient adjustment of the effective length of the hoisting chain by engaging a desired pair of links, including a support link 55 and an engagement link 54, within the coupling link 100, as illustrated in FIGS. 1a, 1b and 3.

The hoisting chain 50 can be pulled simply, i.e. with one part, through the coupling link 100, as illustrated in FIG. 1a, or double, i.e. with two parts, through the coupling link 100, as illustrated in FIG. 1b. Alternatively, the hoisting chain may of course hang down directly from the anchoring pin 190 (compare FIGS. 18 and 19). From this state, it is easy to shift to the adjustable arrangement according to FIG. 1b, wherein a double or U-shaped loop is pulled through the inner space of the coupling link. When shifting to the arrangement according to FIG. 1a, which is a permanent shortening arrangement, on the other hand, one has to insert the hoisting chain 50 into the coupling link 100 before the end link 51 is anchored thereto.

The coupling link 100 is elongated and comprises a first end portion 110, a mid portion 130 and a second end portion 150 (FIG. 2).

The first end portion 110 is intended to be connected to the ring 10 or some other hoisting means, and to enable pulling through one or more parts of the hoisting chain 50. For this purpose, it is loop-formed with a well defined inner space 111 dimensioned to enable such a pulling through operation. The loop portion 110 is defined by the upper, widened portion of a forged, substantially U-shaped link body 101 having an upper, somewhat rounded loop top portion 112, loop side portions 113a, 113b adjoining thereto and loop bottom portions 114a, 114b.

In the region of the mid portion 130 of the coupling link, the loop bottom portions 114a, 114b merge into separate support shanks 131a, 131b being shaped so as to support and engage with the support and engagement links 55, 54.

In the other end portion 150 (the lower one in FIG. 2), the support shanks 131a, 131b merge into separate end or anchoring shanks 151a, 151b having mutually registering holes 152a, 152b for journalling and securing said anchoring pin 190, by means of which the end link 151 of the hoisting chain can be anchored to the coupling link.

In this embodiment, the support and end shanks 131a, 151a and 131b, 151b, respectively, constitute mutually separate shanks of a fork portion which enables insertion of a ring 10 or some other hoisting means, so that the coupling link can be connected to and detached from said means upon detachment of the anchoring pin.

The support shanks 131a, 131b have an intermediate distance, denoted support slot 132 below, the width of which somewhat exceeding the material thickness of the links hoisting chain, so that such a link, i.e. the support link 55, is accommodated in standing position with some play between the support shanks 131a, 131b, i.e. with the main plane of the support link 55 being oriented perpendicularly to the plane of extension of the loop portion 110 of the coupling link. The support shanks 131a, 131b have internal recesses which form concavely rounded seating surfaces 133a, 133b, the geometry of which being adjusted to the external end portions of the hoisting chain links, at each side of the longitudinal central line of the respective link, so that the engagement link 54, adjoining the support link, will make a surface contact with its external end portions at these seating surfaces 133a, 133b. Compare the section in FIG. 4a, where the curvature of the seating surfaces, corresponding to the end portion of the link 54, appears clearly.

The first and second end portions 110 and 150 are located in different planes in the embodiment according to FIGS. 1, 2 and 3, the plane of extension of the other end portion, i.e. the anchoring portion 150, being inclined at about 30° in relation to the plane of extension of the first end portion, i.e. the loop portion 110. The inclinational angle can vary somewhat but is preferably within the interval 20°–60°. By this angled structure one obtains the advantage that the support link 55, standing between the support shanks 131a, 131b, can be oriented with its longitudinal axis lying in the same plane as the first end portion of the coupling link or the loop portion 110. In turn, this means that the hoisting means or the ring 10, the loop portion 110 of the coupling link and the hoisting chain 50 can be oriented along a straight line when being loaded.

In order to enable such an orientation of a support link 55, the support shanks 131a, 131b are provided, at the opposite side relative to the seating surfaces 133a, 133b, with recesses 134a, 134b (see FIGS. 2, 3 and 4b) accommodating a portion of the end part of the link 56 adjoining the support link 55. Since these recesses 134a, 134b must be located at a small distance from the seating surfaces 133a, 133b, corresponding to the free distance between the end portion of the links 54 and 56, the support shanks 131a, 131b of the mid portion 130 form arcuately extending material portions, only one of these, i.e. 135b, being visible in FIG. 3.

Furthermore, the dimensions of the anchoring portion 150 are such that the support link 55 can abut, with its lower end portion, against the end link 51 anchored to the anchoring pin 190.

As shown in FIG. 2, the anchoring pin 90 may have a head 191 at one end and a locking nut 192 at its other end. Alternatively, as illustrated in FIG. 2a, the anchoring pin 193 may have annular grooves 194a, 194b, at its end portions, these grooves cooperating with locking pins 195a, 195b being forced into four holes in the anchoring shanks 151a', 151b'.

The basic embodiment of the coupling link according to the invention, as shown in FIGS. 1–3, can be modified in many ways within the scope of the invention. The loop portion 210a, compare FIG. 5, may have a straight loop top part 212a for suspension in a lifting strap, in particular a strap made of synthetic fibres. It is also possible to provide the loop portion 310a, 310b, 310c, 310d (see FIGS. 6a–6d) with external lugs or ears 315a, 315b, 315c and 315d, respectively, made in one piece and having mutually registering holes for connection of a shackle, a coupling part or directly to a hoisting means. The projection may alternatively be constituted by a hook part 416 integrated with the loop portion 410 (FIG. 11) or a fixed hook shank 416a cooperating with a hook part 416b being pivotably journalled at the loop portion (FIG. 12).

FIGS. 16a and 16b illustrate how the loop portion 510 with the ears 517, formed thereon and having holes, can be connected directly to a hoisting means in the form of an end link 20 of an (upper) hoisting chain. FIG. 17 shows a direct connection of the loop portion 610 of a coupling link to an oval, large link or a ring 30, a connection pin 619 being arranged in ears 618 having registering holes.

As illustrated in FIGS. 14a, 14b and 15, the coupling link may be connected to a lifting hook 40 in that a coupling eye portion 40a having a flat part 40b is threaded between the fork shanks 160a, 160b of the coupling link. For this purpose, the thickness of the flat part 40b is somewhat less than the distance between the fork shanks 160a, 160b. Such an arrangement can, e.g., be used at the bottom of a hoisting chain (e.g. instead of the end link 59 and the hook 80 in FIG. 1), so that the length of the hoisting chain can be adjusted at the bottom in a coupling link connected to the lifting hook. Such dimensions of a lifting hook (the eye portion thereof) and the coupling link will bring about an increased safety in that a too large a lifting hook 40 is provided a flat portion 40b, which cannot be inserted into the gap between the fork shanks 160a, 160b, and a too small a lifting hook 40 is provided with a coupling eye 40a, which does not accommodate a fork shank 160a. Only such lifting members, which are dimensioned for substantially the same loads, can therefore be interconnected in this way.

In FIGS. 7 and 8, a second embodiment of the coupling link 700 is shown, the first and second end portions 710, 750, as well as the mid portion 730, being extended in one single, common plane. The loop portion 710 is substantially similar to the one in the embodiment according to FIGS. 1–3, and the anchoring portion 750 corresponds to the embodiment according to FIG. 2a (although in the same plane as the loop portion). However, the mid portion 730 is designed differently with a web portion 740, which interconnects the support shanks 731a, 731b and which forms a supporting bottom surface 741 for the support link 650 located in the support slot 732, the support link being oriented with its longitudinal axis perpendicularly to the plane of extension of the coupling link. At each side of the support slot 732, the support shanks have obliquely slanting support surfaces 742a, 742b forming a support for the hoisting chain link 66 adjoining the support link at the side of the load, as well as concavely rounded seating surfaces 733a, 733b for area contacting support of the end part of the engagement link 64. The lower part of the web portion 740 is recessed so as to accommodate the next link 67.

In this case, the coupling link 700 will be positioned with some inclination, but the inclination is moderate, since the coupling link is elongated and the link 67 (oriented in line with the loaded hoisting chain) is located adjacent to the anchored end link 61.

As illustrated in FIGS. 9 and 10, and angled coupling link 800, having mutually angled end portions as in FIGS. 1–3, may also be provided with a web portion 840. In relation to the embodiment according to FIGS. 1–3, there is also a difference in that the mid portion 830, having support shanks and a web portion, has a somewhat longer extension.

Finally, FIGS. 18–21 illustrate how one or more coupling links 100 may be connected to a hoisting means in the form of a large, oval ring 10', which in this case is manufactured together with the coupling link and is permanently connected to the latter, e.g. by forming the ring by welding a blank upon hooking the blank into the loop portion of the coupling link. In the initial position, only the end link 51 of the hoisting chain is anchored to the anchoring pin 190 of the coupling link, but upon attachment of the anchoring pin, the hoisting chain can be pulled through the loop portion and be secured with selected support and engagement links in a similar manner as in FIG. 1a.

In FIGS. 18 and 19, only one coupling link 100 is connected to the ring 10' in this way, in FIG. 20 there are two coupling links 100, being angled in opposite directions, being permanently connected to the ring 10', and in FIG. 21, there are four coupling links 100 being permanently connected to the ring 10' with the intermediary of two coupling rings 10", each being connected to two coupling links 100.

The coupling link described above can be modified and further developed within the scope of appended claims. For example, the mid portion of the coupling link may be provided with special locking means for retaining the support and engagement links of the hoisting chain in engaging positions. Such locking means are known per se, for use in connection with lifting members, and may be either automatically self locking, e.g. by spring or snap action, or manually operated, e.g. by displacement or rotation of a locking element into locking position.

I claim:

1. Coupling link (100) to be interconnected between a hoisting means (10) and a shortenable hoisting chain (50), said coupling link having a connection portion (110) for connection to said hoisting means and an anchoring portion (150) for anchorage of an end link (51) of said hoisting chain, wherein a selected link, namely a support link (55), of said hoisting chain is inserted into a support slot (132) between two support shanks (131a, 131b) of the coupling link, and a hoisting chain link adjoining said support link, namely an engagement link (54), engages, at an end portion thereof, with corresponding seating surfaces (133a, 133b) formed in said support shanks, characterized in that the coupling link is elongated and comprises
a first end portion formed as a loop portion (110), which constitutes said connection portion,
a mid portion (130), which is provided with said support shanks and said support slot, and
a second end portion (150), which constitutes said anchoring portion,
wherein said loop portion defines a free interior space (111), which is dimensioned to enable pulling through the hoist chain (50) for adjustment of its effective length and which directly adjoins said support slot (132) of said mid portion (130),
and in that said loop portion, said mid portion and said anchoring portion of the coupling link are made in one piece of a link body (101) having a shank thickness, which substantially exceeds that of the links of the associated hoisting chain.

2. Coupling link (700) as defined in claim 1, characterized in that said first and second end portions (710, 750) are located substantially in the same plane and in that the support slot (732) and the support shanks (731a, 731b) with said seating surfaces (733a, 733b) are formed in such a way that the longitudinal axis of the support link (65) is oriented transversely in relation to said plane.

3. Coupling link (100) as defined in claim 1, characterized in that said first end portion (110) is located in a first plane and that said second end portion (150) is located in a second plane, which is inclined in relation to the first plane, wherein the mid portion (130) of the coupling link forms a transition between said first and said second planes.

4. Coupling link as defined in claim 3, characterized in that the support slot (132) is oriented in such a way that the longitudinal axis of the support link (55) is located in said first plane.

5. Coupling link as defined in any one of claims 1, characterized in that the support slot (132) and the support shanks with said seating surfaces (133a, 133b) are formed in such a way that said engagement link (54) projects outwardly from the plane of the first end portion (110) in a position lying down.

6. Coupling link as defined in claim 5, characterized in that said seating surfaces (133a, 133b) are constituted by internal recesses in the link body at said mid portion (130).

7. Coupling link as defined in claim 6, characterized in that said support shanks (131a, 131b), at the opposite side of said seating surfaces (133a, 133b), have internal recesses (134a, 134b) for accommodating the chain link (56) adjoining the support link.

8. Coupling link as defined in claim 7, characterized in that said seating surfaces (133a, 133b) and said recesses (134a, 134b) of each support shank (131a, 131b) form, between themselves, a substantially arcuately extending material portion (135b).

9. Coupling link as defined in claim 5, characterized in that said support link (55) is held in place partly by its abutment against the end link (51) of the hoisting chain at said anchoring portion (150).

10. Coupling link as defined in claim 1, characterized in that said mid portion (130) and said anchoring portion (150) together form a fork portion.

11. Coupling link as defined in claim 10, characterized in that the fork portion (130, 150) comprises two separate shanks, which are provided with a transversal anchoring pin (190) for said end link (51) at the end of said anchoring portion.

12. Coupling link as defined in claim 11, characterized in that the anchoring pin (190) is detachable.

13. Coupling link as defined in claim 11, characterized in that the anchoring pin (193) is formed so as to hold the separate shanks at a predetermined distance from each other.

14. Coupling link (700) as defined in claim 10, characterized in that the fork portion (730, 750) comprises two shanks being held together by a web portion (740).

15. Coupling link as defined in claim 14, characterized in that the web portion (740) forms a support surface (741) for said support link (65).

16. Coupling link (100) as defined in any one of claim 1, characterized in that the internal space (111) of the loop portion (110) is so large that it accommodates a hook or loop portion of said hoisting means (10) as well as said hoisting chain links (54, 55, 56) with a certain play.

17. Coupling link as defined in any one of claim 1, characterized in that said internal space (111) accommodates two parts of the hoisting chain (50, FIG. 1b).

18. Coupling link as defined in claim 1, characterized in that said loop portion (310a–d) has external lugs (315a–d) provided with holes, said lugs being inter connectable with a shackle, a coupling part, a chain link, or the like, of said hoisting means.

19. Coupling link as defined in claim 1, characterized in that said loop portion (410) is integrated in one piece with an external hook part (416).

20. Coupling link as defined in claim 1, characterized in that said loop portion (410) externally comprises a pivotably journalled hook part (416b) as well as a fixed hook shank (416a) being adapted to close the hook opening when the hook part is located in its operative position.

21. Coupling link as defined in claim 1, characterized in that the distance between the shanks (131a, 131b) of the fork portion somewhat exceeds the material thickness of the hoisting chain links (55) and in that this distance also somewhat exceeds the thickness of a locally flattened part (11) of said hoisting means (10), so that the latter can be inserted between the shanks of the fork portion and thereby be connected to the coupling link.

22. Coupling link as defined in claim 1, characterized in that said coupling link (100) is permanently connected to an oval ring (10') constituting said hoisting means and being inserted into the loop portion of the coupling link during manufacture thereof and being thereafter closed, e.g., by welding.

23. Coupling link as defined in claim 22, characterized in that the coupling link is permanently connected with one or more oval rings (10', 10") being connected to other, similar coupling links (100) in a corresponding manner.

* * * * *